Feb. 12, 1924.
H. J. COOK
1,483,078
SPOKE CONNECTION
Filed Oct. 20, 1921
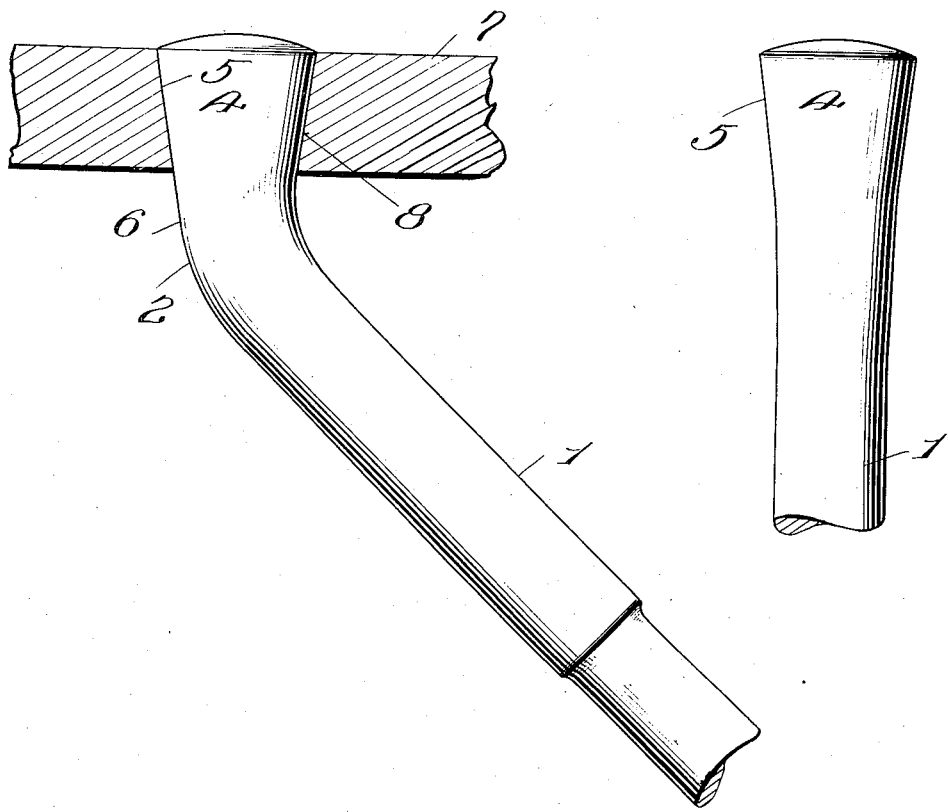
Harmon J. Cook, Inventor
By Sturtevant & Mason, Attorneys Patented Feb. 12, 1924.

1,483,078

UNITED STATES PATENT OFFICE.

HARMON J. COOK, OF TORRINGTON, CONNECTICUT, ASSIGNOR TO THE TORRINGTON COMPANY, OF TORRINGTON, CONNECTICUT, A CORPORATION OF CONNECTICUT.

SPOKE CONNECTION.

Application filed October 20, 1921. Serial No. 508,973.

*To all whom it may concern:*

Be it known that I, HARMON J. COOK, a citizen of the United States, residing at Torrington, in the county of Litchfield, State of Connecticut, have invented certain new and useful Improvements in Spoke Connections, of which the following is a description, reference being had to the accompanying drawings and to the figures of reference marked thereon.

This invention relates to spoke connections for wheels of the wire spoke type.

In such constructions, it has heretofore been the practice to form the outer bent end of the spoke with an enlargement or head on its extremity to prevent the spoke from pulling through its spoke hole or countersink in the hub. The portion of the spoke immediately below this head has heretofore constituted the bearing fitting the spoke hole.

This construction has been objectionable for the reason that the head of the spoke and the hole in the hub have acted as a sort of ball and socket thereby allowing the spoke to rock in its countersink and greatly increasing the vibrations which are the cause of wearing at the bearing. So also this objectionable rocking of the spoke in its countersink is augmented by the fact that the spoke hole is necessarily made somewhat larger than the body of the spoke in order to permit the bent portion of the spoke end to pass through the spoke hole.

In a prior patent granted to James H. Graham, Reissue No. 15,109, of May 24, 1921, and assigned to the assignee of this present application, it was proposed to form the bent portion of the spoke with an enlarged bell shaped end adapted to fit within a similarly shaped countersink in the hub thereby combining the bearing portion of the spoke and the head. In this bell-shaped construction the concaved walls of the bell of the spoke permitted the spoke to rock freely in its similarly formed countersink of the hub, and to prevent wearing of the bearing surfaces due to this rocking, the extreme edges of the countersink were cut away on smooth lines or flared outwardly. While this bell-shaped construction has materially reduced the wearing of the spoke bearing and has provided a spoke which cannot pull out of its hole, still the rocking movement is objectionable. To this end, the present invention has for its object the construction of a combined head and bearing portion of the spoke in which the walls of the spoke and contacting countersink are designed to eliminate any tendency of the spoke to rock in its spoke hole thereby eliminating undue vibrations and consequent wear.

Yet another object of this invention resides in providing a connection of the described character in which the spoke forms a perfect bearing fit with the walls of the hub throughout their entire thickness.

Another feature of this invention resides in the construction of the combined bearing surface and head of the spoke and the hub countersink so that any variations in depth of the countersinks of the hub will not effect the perfect fitting of the spoke in its countersink.

Yet another feature of this invention resides in forming the spoke with a conically shaped combined bearing and head portion adapted to fit in a correspondingly shaped hole in the hub, by which construction the hole in the hub can be made large enough to allow the bent portion of the spoke to pass through and still provide a firm and tight bearing which will not pull through.

These and other objects will in part be obvious and will in part be hereinafter more fully disclosed.

In the drawings which show by way of illustration one embodiment of the invention—

Figure 1 is a side elevation of the spoke, the hub being shown in section, and

Fig. 2 is a view of the spoke end at right angles to Fig. 1.

Referring to the drawings in detail, the spoke 1 is preferably circular in cross section and is bent at its outer end at 2 to form the desired connection with the hub. The outer end or portion of the spoke is formed as an enlargement 4 to form a combined bearing and head. The outer walls 5 of this enlargement are conically shaped, that is, they taper uniformly and on substantially the inner straight lines from the bend 2 to the outer end portion 6 of the bend 2 to the outer end of the enlargement. In other words, the taper on the outer end portion of the spoke does not cease at the point of contact of the spoke with the hub openings, but extends beyond the latter. This results in an elongated tapering head portion which serves to distribute or dissipate the vibrations of the spoke in action in the wheel and prevents rapid "wire fatigue."

As herein shown, the hub 7 is provided with a countersink or spoke-hole 8, the walls of which are also conically shaped to correspond to the contour of the spoke enlargement 4, although it will be understood that, in the broader aspect of the invention, modifications of its structure are permitted.

It will be evident that in this present construction the conical walls of the spoke will fit the walls of the countersink throughout the entire thickness of the hub thereby eliminating any rocking action of the spoke wall on its hub seat. Furthermore, by reason of this construction, any variation in depth of the various spoke-holes will not be effective and for the same reason, the increase in diameter of the countersinks to permit the introduction of the bend in the spokes, will not effect the tight, firm fit of the spoke in its hole. Due to this conical shaped enlargement there will be no chance of the spoke pulling out of its hole or shearing off since there are no projecting shoulders.

It is obvious that minor changes in the details of construction and the arrangement of the parts may be made without departing from the spirit of the invention as set forth in the appended claims.

Having thus described the invention, what I claim as new and desire to secure by Letters Patent, is—

1. A spoke connection comprising a hub formed with a conically shaped spoke hole or countersink, and a spoke formed with a conical enlargement or tapered portion adapted to make a firm tight bearing with the inner wall of the countersink and prevent said spoke from pulling out, said conical enlargement or taper being extended beyond the point of connection of the spoke toward the main or central portion of said spoke.

2. A spoke connection comprising a hub formed with a conical shaped spoke hole, the walls of which in longitudinal section are straight lines substantially symmetrically disposed about the center line of the hole, and a spoke formed with a conical enlargement shaped to conform to the spoke hole, the end of the spoke being slightly rounded and substantially flush with the inner face of the hub, and the body portion of the spoke being bent at an acute angle to the longitudinal center of the spoke hole said conical enlargement continuing its taper beyond the point of its connection with the hub and extended toward the main or central portion of the spoke.

In testimony whereof I affix my signature.

HARMON J. COOK.